(No Model.)
F. M. GILBERT.
BIRD CAGE.
No. 459,396.          Patented Sept. 15, 1891.
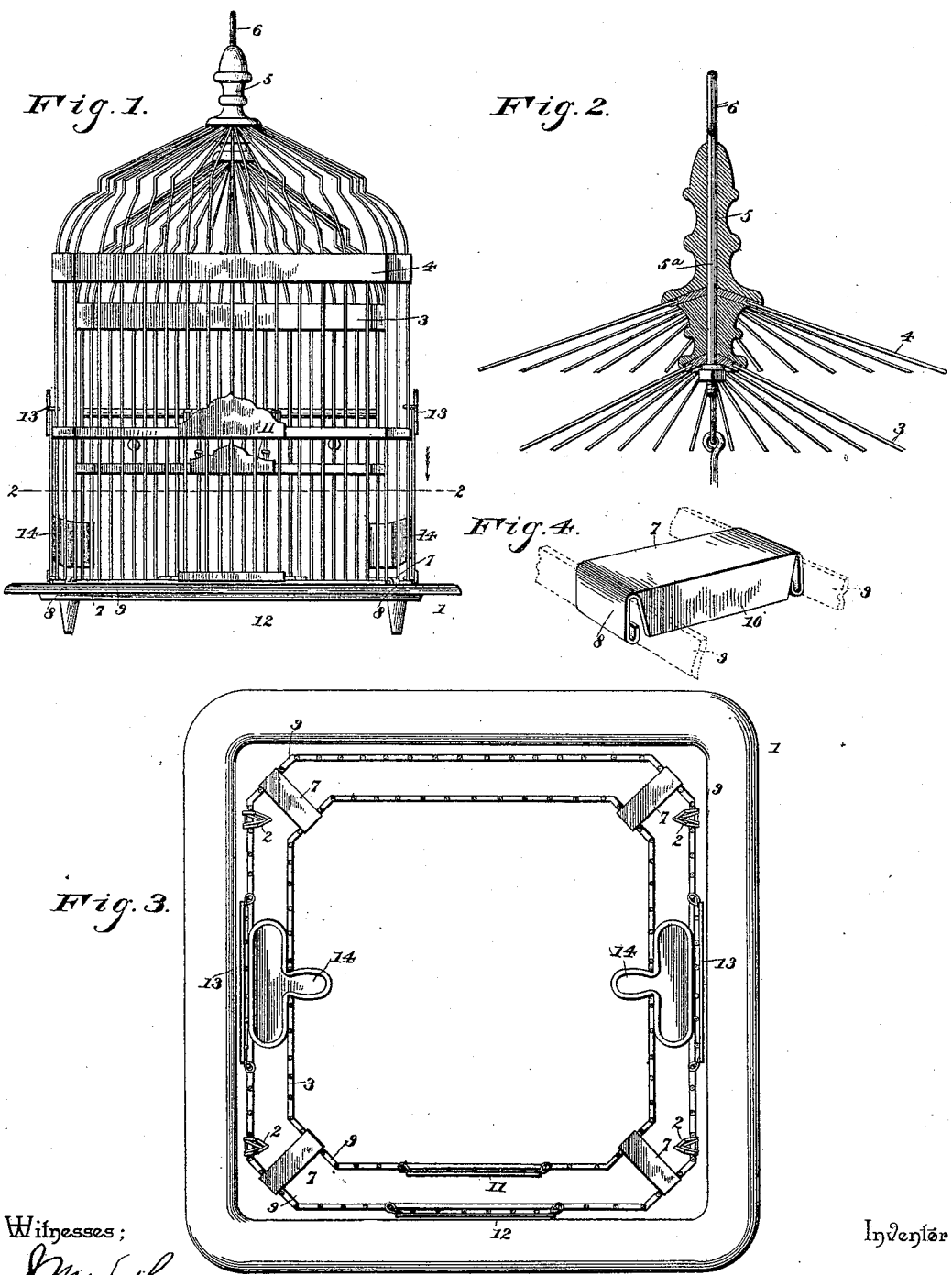

UNITED STATES PATENT OFFICE.

FRANCES M. GILBERT, OF SILVER CITY, TERRITORY OF NEW MEXICO.

BIRD-CAGE.

SPECIFICATION forming part of Letters Patent No. 459,396, dated September 15, 1891.

Application filed April 18, 1891. Serial No. 389,487. (No model.)

*To all whom it may concern:*

Be it known that I, FRANCES M. GILBERT, a citizen of the United States, residing at Silver City, in the county of Grant and Territory of New Mexico, have invented a new and useful Bird-Cage, of which the following is a specification.

This invention relates to bird-cages, and it may be described as an improvement on the device of this class for which Letters Patent of the United States No. 436,475 were issued to myself on the 16th day of September, 1890.

My present invention consists in the improved construction, arrangement, and combination of parts, which will be hereinafter fully described, and particularly pointed out in the claims.

In the drawings hereto annexed, Figure 1 is a front elevation of a bird-cage constructed in accordance with my invention. Fig. 2 is a vertical sectional view showing the manner of connecting the wires to the post at the top. Fig. 3 is a horizontal sectional view on line 2 2 of Fig. 1. Fig. 4 is a detail perspective view of the clamps.

Like numerals of reference indicate corresponding parts in all the figures.

1 designates the bottom of the cage, which is provided with hooks 2, of any well-known construction, for the attachment of the body of the cage. The latter is composed of an inner and an outer cage, designated, respectively, by 3 and 4, the bars or wires of said inner cage being at a suitable distance from those of the outer cage—say one and one-half inches at the sides and two and a half inches at the top. These dimensions, however, may be varied at will without departing from the spirit of my invention. The wires of the outer cage are set out of alignment with the wires of the inner cage, (see Fig. 3,) so that in case a cat should insert her paw through the spaces between the wires of the outer cage it will strike the wire of the inner cage, and thus injury to the bird be prevented.

The tops of the inner and outer cages are both connected by the sectional post 5, which is extended above the top of the outer cage, the sections of the post being connected by the rod $5^a$, provided with a ring, as 6, by means of which the cage may be suspended. The lower end of the rod $5^a$ is threaded and provided with tightening-nuts to lock the sections of the post together. The top wires of the inner and outer cages are to be suitably connected with and clamped by the two sections of said post, which thus serves to connect the inner and outer cages securely together. The lower ends of the said inner and outer cages may be connected by means of sheet-metal clamps, as 7, which are provided with lips 8, turned down over the strips 9, which connect the lower ends of the bars of the wires of said cages, and with flanges 10, turned down between said connecting-strips, which are thereby spaced the desired distance apart. These connecting-clamps may, however, be dispensed with when desired.

The inner and outer cages are provided with doors 11 and 12, that are arranged in alignment with each other, and the outer cage is likewise provided with doors 13 for the admission of the feed-cups 14, which latter are accommodated and held in the space between the two cages.

The operation and advantages of my invention will readily be understood. The double cage protects the bird confined therein from animals of prey, and the device is simple, safe, and when properly constructed will present a neat and ornamental appearance.

I do not desire to be understood as limiting myself to the precise construction herein described, but reserve the right to any such changes and modifications as may be resorted to without departing from the spirit of my invention. It will also be seen that in filling and cleaning the feed and water cups it is not necessary to open the doors to the inner cage, and thus there is no possibility of frightening the bird by reaching into the cage to remove and replace the cups, and, furthermore, the bird cannot by this means escape.

Having thus described my invention, what I claim, and desire to secure by Letters Patent, is—

1. In a bird-cage, the combination, with the bottom, of the body consisting of an inner and an outer cage and the post connecting the tops of the inner and outer cages, substantially as set forth.

2. The combination of the inner and outer cages, the central post connecting the tops of said cages, and the clamps connecting the lower edges of said cages, substantially as set forth.

3. The combination of the inner and outer cages having binding-strips at their lower edges and the clamps connecting the binding-strips at their lower edges, said clamps being provided with lips turned down over the said binding-strips and with flanges turned down between the latter, substantially as set forth.

4. The combination of the inner and outer cages arranged at a distance apart from the top to the bottom, feed-cups held in the spaces between the cages, doors arranged in said inner and outer cages in alignment with each other, and additional doors in the outer cage for the admission of the feed-cups, substantially as and for the purpose set forth.

5. In a bird-cage, the combination, with the bottom, of the body consisting of an inner and an outer cage, the tops of each of which are connected by the same post, said post being made sectional and locked together by the suspending-rod, substantially as set forth.

In testimony that I claim the foregoing as my own I have hereto affixed my signature in presence of two witnesses.

FRANCES M. GILBERT.

Witnesses:
ALFRED C. DRAPER,
C. C. SHOEMAKER.